US009781622B2

(12) United States Patent
Nieminen et al.

(10) Patent No.: US 9,781,622 B2
(45) Date of Patent: Oct. 3, 2017

(54) DECISION MAKING BASED ON REMOTE OBSERVATION OF NODE CAPABILITIES

(75) Inventors: Johanna Nieminen, Espoo (FI); Markku Anttoni Oksanen, Helsinki (FI); Teemu Ilmari Savolainen, Nokia (FI); Jussi Ruutu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 136 days.

(21) Appl. No.: 14/423,851

(22) PCT Filed: Aug. 30, 2012

(86) PCT No.: PCT/IB2012/054474
§ 371 (c)(1),
(2), (4) Date: Feb. 25, 2015

(87) PCT Pub. No.: WO2014/033499
PCT Pub. Date: Mar. 6, 2014

(65) Prior Publication Data
US 2015/0189530 A1 Jul. 2, 2015

(51) Int. Cl.
*H04W 4/00* (2009.01)
*G06F 15/16* (2006.01)
(Continued)

(52) U.S. Cl.
CPC ......... *H04W 24/10* (2013.01); *H04L 41/0803* (2013.01); *H04W 24/02* (2013.01); *H04W 36/08* (2013.01); *H04W 84/12* (2013.01)

(58) Field of Classification Search
CPC ..... H04W 24/10; H04W 24/02; H04W 36/08; H04W 84/12; H04L 41/0803
See application file for complete search history.

(56) References Cited

U.S. PATENT DOCUMENTS

2008/0071899 A1   3/2008 Odaka et al.
2009/0247201 A1  10/2009 Ye et al.
(Continued)

FOREIGN PATENT DOCUMENTS

CN    102378237    3/2012
CN    102550117    7/2012
(Continued)

OTHER PUBLICATIONS

Shelby, "CoRE Interfaces Draft-Shelby-Core-Interfaces-01", Core Internet-Draft, Jan. 31, 2012, pp. 1-17.
(Continued)

*Primary Examiner* — Kiet Tang
(74) *Attorney, Agent, or Firm* — Alston & Bird LLP

(57) ABSTRACT

A method, apparatus, and computer program product are provided for making network optimization decisions based on observed network node performance information. Network nodes may continuously report performance measurement information to network servers. Observers may request registration with the servers and access to the mode measurement information. The observer may specify a measurement threshold that, when met, causes the server to report node measurement data to the observer. The node measurement data enables the observer to make network optimization and control decisions. An optimal radio frequency might be selected; a node might switch between different gateways or cause a handoff from one gateway to another for efficient traffic routing. A user could observe measurement data for friends and receive notice when friends are in close proximity or engaged in like activity such that a social contextual community might be formed.

16 Claims, 5 Drawing Sheets

(51) Int. Cl.
*G06Q 30/00* (2012.01)
*H04W 24/10* (2009.01)
*H04L 12/24* (2006.01)
*H04W 36/08* (2009.01)
*H04W 24/02* (2009.01)
*H04W 84/12* (2009.01)

(56) References Cited

U.S. PATENT DOCUMENTS

| | | | |
|---|---|---|---|
| 2010/0076714 A1 | 3/2010 | Discenzo | |
| 2010/0081387 A1 | 4/2010 | Shi et al. | |
| 2011/0314512 A1 | 12/2011 | Sinha et al. | |
| 2012/0184306 A1 | 7/2012 | Zou et al. | |
| 2012/0314587 A1* | 12/2012 | Curticapean | G01S 5/0257 370/252 |
| 2013/0058245 A1* | 3/2013 | Van Lieshout | H04W 36/0083 370/252 |
| 2013/0317910 A1* | 11/2013 | Mohamed | G06Q 30/0269 705/14.58 |
| 2015/0350287 A1* | 12/2015 | Novo Diaz | H04L 65/607 709/203 |

FOREIGN PATENT DOCUMENTS

| | | |
|---|---|---|
| JP | 2014-510463 A | 4/2014 |
| KR | 2008-0101979 A | 11/2008 |
| WO | 2007/094309 A1 | 8/2007 |
| WO | 2010117998 | 10/2010 |
| WO | 2012061383 | 5/2012 |
| WO | 2012/112092 A1 | 8/2012 |

OTHER PUBLICATIONS

Hartke, "Observing Resources in the Constrained Application Protocol (CoAP)", RFC 7641, Internet Engineering Task Force, Sep. 2015, pp. 1-30.
Gundavelli et al., "Proxy Mobile IPv6", RFC 5213, Network Working Group, Aug. 2008, pp. 1-92.
Shelby et al., "Constrained Application Protocol (CoAP) draft-ietf-core-coap-18", Internet-Draft, Core Working Group, Jun. 28, 2013, pp. 1-118.
Office action received for corresponding Japanese Patent Application No. 2015-529131, dated Feb. 9, 2016, 3 pages of office action and 3 pages of office action translation available.
International Search Report and Written Opinion received for corresponding Patent Cooperation Treaty Application No. PCT/IB2012/054474 dated Sep. 26, 2013, 13 pages.
Office action for corresponding Chinese patent Application No. 201280075463.3, dated Aug. 14, 2017, 15 pages.

* cited by examiner

DECISION MAKING BASED ON REMOTE OBSERVATION OF NODE CAPABILITIES

RELATED APPLICATION

This application was originally filed as PCT Application No. PCT/IB2012/054474 filed Aug. 30, 2012.

TECHNOLOGICAL FIELD

The technical field is network connectivity for various nodes and measurement of their connection quality; specifically observing and reporting measurement values for nodes such as sensors using Bluetooth Low-energy Radio, ZigBee, WiFi Low Power or similar devices.

BACKGROUND

Nodes, such as sensors using Bluetooth Low-Energy radio, ZigBee, WiFi Low Power or alike, may be connected to the Internet and transmit measurement data to a server or other storage destination. In some instances, it would be beneficial to be able to observe the current status of nodes that are connected to the Internet and optimize certain network or radio parameters, or even one's social community, based on this status information. Especially for nodes sending measurements that change infrequently, it would not make sense to observe each measurement value. Instead, it would be considerably more efficient to set up dedicated observers in the web servers with the capability to inform when a node's measurement value has significantly changed; that is, when a predefined threshold has been exceeded.

The observed values could be used when optimizing cognitive radio parameters including channel allocation tied to a certain location, maximum available power in a gateway, power and range in a sensor node, data transmission speed of the radio interface, the time when data can be sent, and the time when the sensor nodes should only collect data (in TV White Spaces radio it might not be permissible for other nodes to use the White Spaces for data transmission at the best TV transmission time). Observed node measurement values could also be utilized for choosing the right gateway, or making a handover decision, in failure diagnostics, in security systems, or when forming optimal situational social communities based on who happens to be in physical proximity or in the same activity status (such as jogging, partying, studying, laughing, feeling sad, on holiday, or the like).

BRIEF SUMMARY

Among various embodiments is a method comprising causing a registration request to be sent for observed node measurement information, receiving observed node measurement information in an instance in which said measurement information reaches a predetermined threshold, and taking action based on said observed node measurement information. The method may include identifying in the registration request the network node for which measurement information is requested and identifying in the registration request the predetermined threshold for reporting observed node measurement information. The method may also include identifying in said registration request the requestor's identity and authorization to receive observed node measurement information. The registration request may be signaled in a Constrained Application Protocol (CoAP) message wherein the registration request takes the form of a CoAP GET message with Observe Option.

A resulting action that may be taken comprises one or more of optimizing network parameters, making appropriate network control decisions, and forming contextual social network communities. Optimizing network parameters may comprise one or more of choosing an optimal radio frequency based on one or more measured parameters such as channel allocation at a certain location, maximum available power in a gateway, power and range in a sensor node, and data transmission speed of the radio interface. Making network control decisions may comprise one or more of switching said node between gateways when the node's properties change such that a handover becomes viable, and failure scenarios wherein upon a node failure determination a fast handover to another node can be made. Forming contextual social network communities may comprise observing the measurement data of friends, including one or more of receiving notification when they are in close physical proximity or determining from measured data that friends are in the same activity status, then linking the friends into a social network community.

In another embodiment an apparatus is provided comprising at least a processor and a memory communicatively associated with the processor with computer coded instructions stored therein, said instructions when executed by the processor causing the apparatus to perform the process of: causing a registration request to be sent for observed node measurement information; receiving observed node measurement information in an instance in which said measurement information reaches a predetermined threshold; and taking action based on said observed node measurement information. Other instructions may cause the apparatus to perform one or more of the processes of identifying in said registration request the network node for which measurement information is requested, identifying in said registration request the predetermined threshold for reporting observed node measurement information, and identifying in said registration request the requestor's identity and authorization to receive observed node measurement information. The instructions may cause the apparatus to perform signaling of the registration request in a Constrained Application Protocol (CoAP) message, and/or formatting of the registration request as a CoAP GET message with Observe Option.

The memory of the apparatus may store instructions that cause the apparatus to perform optimizing network parameters, making appropriate network control decisions, and forming contextual social network communities. Optimizing network parameters may comprise one or more of choosing an optimal radio frequency based on one or more measured parameters such as channel allocation at a certain location, maximum available power in a gateway, power and range in a sensor node, and data transmission speed of the radio interface. Making network control decisions may comprise one or more of switching said node between gateways when the node's properties change such that a handover becomes viable, and failure scenarios wherein upon a node failure determination a fast handover to another node can be made. Forming contextual social network communities may comprise observing the measurement data of friends, including one or more of receiving notification when they are in close physical proximity or determining from measured data that friends are in the same activity status, then linking the friends into a social network community.

Another embodiment is a computer program product comprising a non-transitory computer readable medium having computer coded instructions stored therein, the instructions when executed by a processor, causing an apparatus to perform the process of: causing a registration request to be sent for observed node measurement information; receiving observed node measurement information when said measurement information reaches a predetermined threshold; and taking action based on said observed node measurement information. The program product may include instructions for identifying in said registration request the network node for which measurement information is requested, identifying in said registration request the predetermined threshold for reporting observed node measurement information, and identifying in said registration request the requestor's identity and authorization to receive observed node measurement information. Further instructions may cause signaling of the registration request in a Constrained Application Protocol (CoAP) message and formatting the registration request as a CoAP GET message with Observe Option.

Other instructions may cause optimizing network parameters, making appropriate network control decisions, and forming contextual social network communities. Optimizing network parameters may comprise one or more of choosing an optimal radio frequency based on one or more measured parameters such as channel allocation at a certain location, maximum available power in a gateway, power and range in a sensor node, and data transmission speed of the radio interface. Making network control decisions may comprise one or more of: switching said node between gateways when the node's properties change such that a handover becomes viable, and failure scenarios wherein upon a node failure determination a fast handover to another node can be made. Forming contextual social network communities may comprise observing the measurement data of friends, including one or more of receiving notification when they are in close physical proximity or determining from measured data that friends are in the same activity status, then linking the friends into a social network community.

In another embodiment, a system is provided comprising a network, at least one node communicating through said network, at least one server, and at least one observer, wherein based upon node measurements reported to the observer by the server, one or more of optimizing network parameters, making appropriate network control decisions, and forming contextual social network communities is performed. In the system the at least one observer may send a registration request for observed node measurement information, identify in said registration request the network node for which measurement information is requested, identify in said registration request a predetermined threshold for reporting observed node measurement information, and identify in said registration request the requestor's identity and authorization to receive observed node measurement information. In this system the at least one observer may signal the registration request in a Constrained Application Protocol (CoAP) message, formats the registration request as a CoAP GET message with Observe Option, and receive observed node measurement information from the server when said measurement information reaches the predetermined threshold.

In this system, optimizing network parameters may comprise one or more of choosing an optimal radio frequency based on one or more measured parameters such as channel allocation at a certain location, maximum available power in a gateway, power and range in a sensor node, and data transmission speed of the radio interface. Making network control decisions may comprise one or more of: switching said node between gateways when the node's properties change such that a handover becomes viable, and failure scenarios wherein upon a node failure determination a fast handover to another node can be made. Forming contextual social network communities may comprise observing the measurement data of friends, including one or more of receiving notification when they are in close physical proximity or determining from measured data that friends are in the same activity status, then linking the friends into a social network community.

In a further embodiment, an apparatus is provided that includes means for causing a registration request to be sent for observed node measurement information, means for receiving observed node measurement information in an instance in which said measurement information reaches a predetermined threshold, and means for taking action based on said observed node measurement information.

BRIEF DESCRIPTION OF THE SEVERAL VIEWS OF THE DRAWINGS

Figure 1:
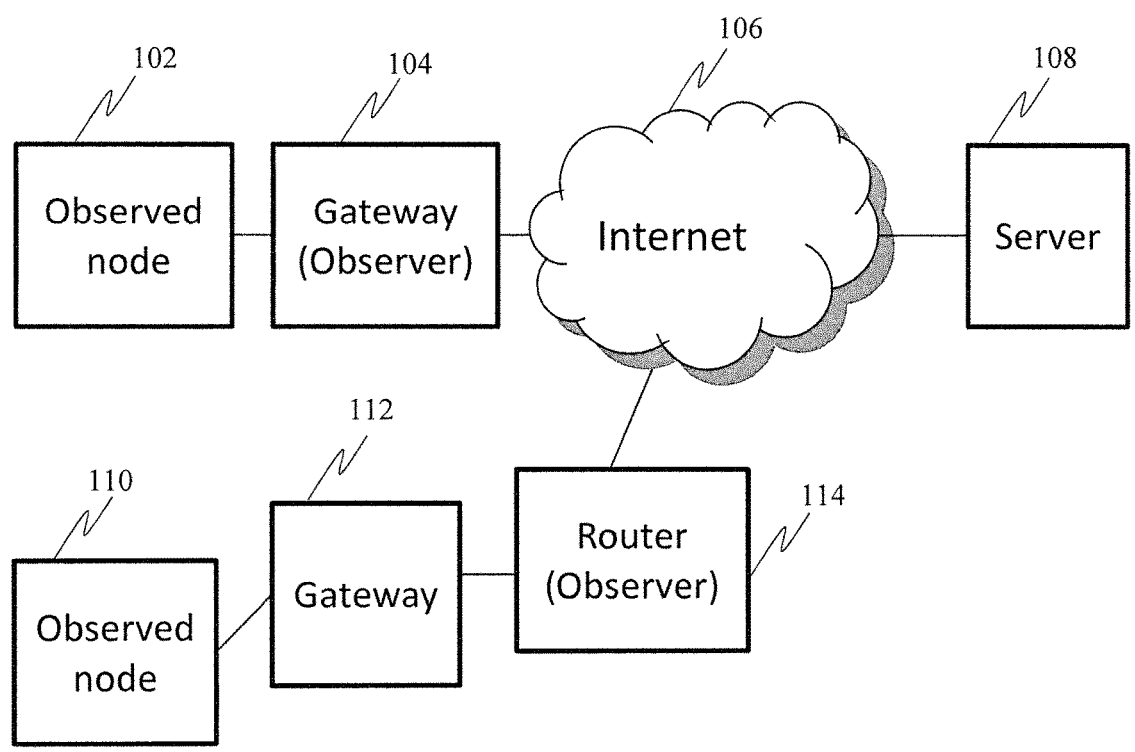

Having thus described certain embodiments of the invention in general terms, reference will now be made to the accompanying drawings, which are not necessarily drawn to scale, and wherein:

FIG. 1 is a schematic drawing of a representative configuration of a network having a server and observed nodes that may support an example embodiment of the present invention.

Figure 2:
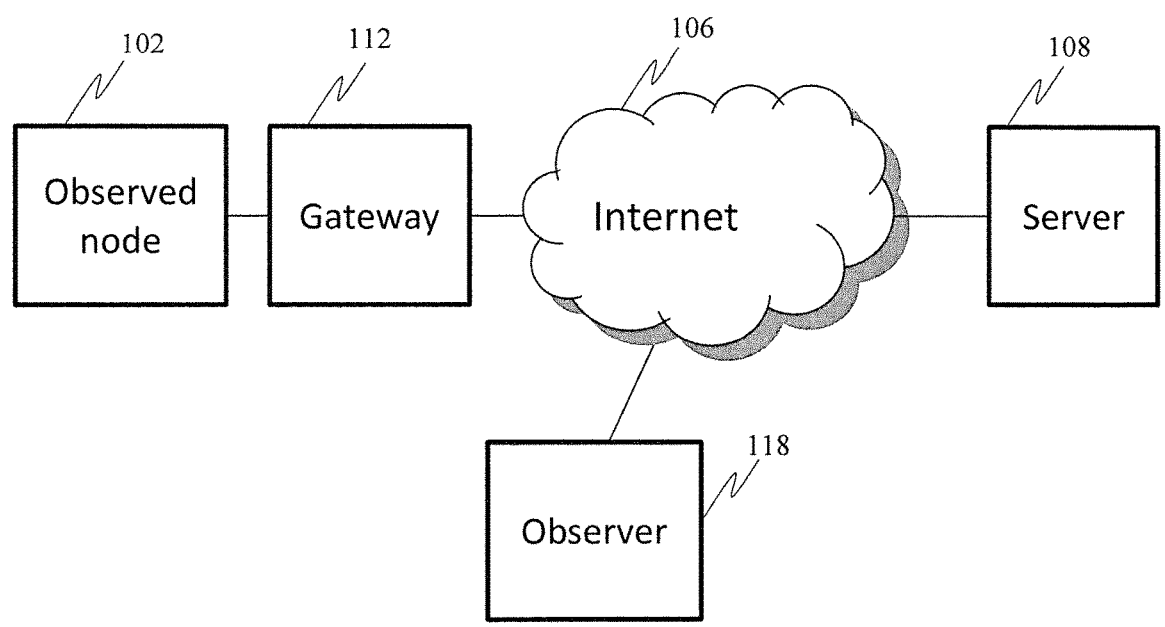

FIG. 2 is a schematic drawing of another representative configuration of a network, server and node that may support an example embodiment of the present invention.

Figure 3:
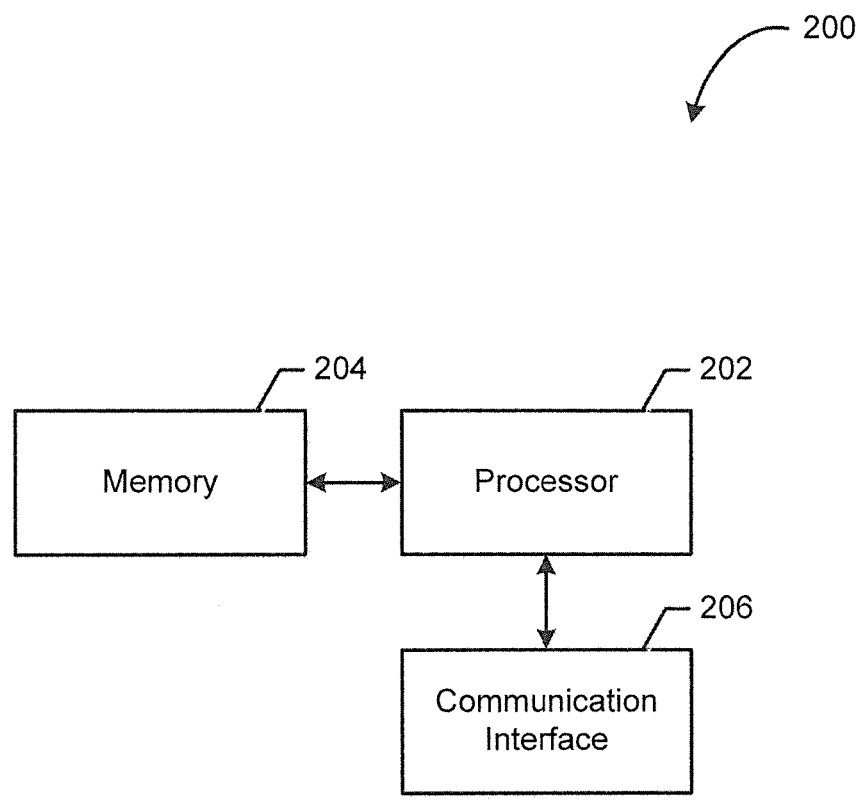

FIG. 3 is a block diagram of an apparatus that may be embodied by an observer and that may be specifically configured in accordance with an example embodiment of the present invention.

Figure 4:
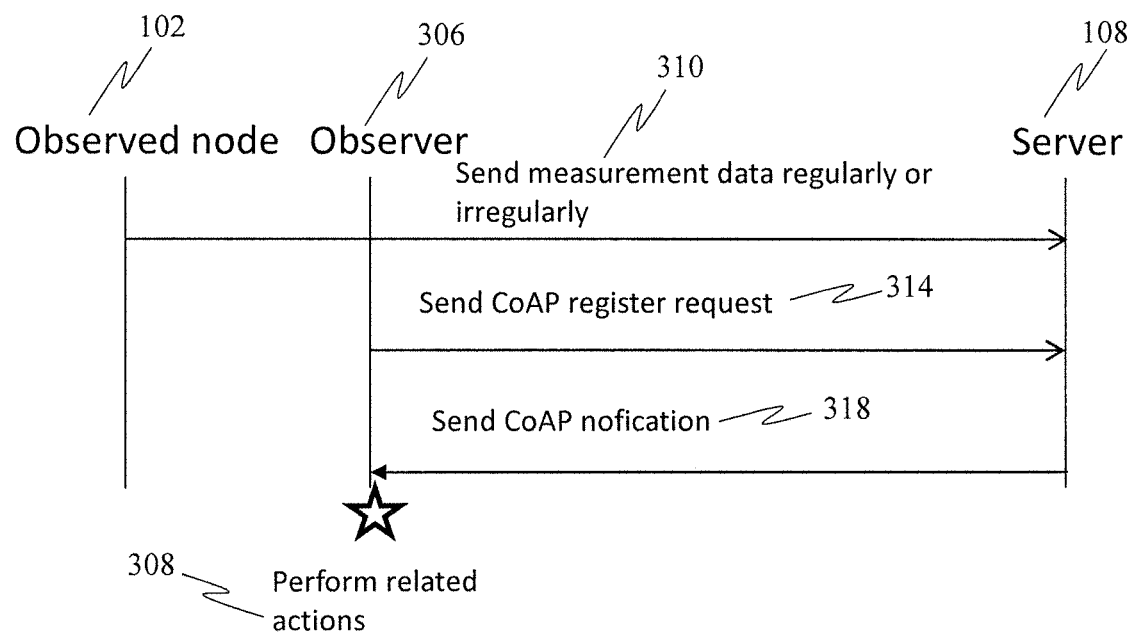

FIG. 4 is a signal diagram of Constrained Application Protocol (CoAP) node measurement data reporting in accordance with an example embodiment of the present invention.

Figure 5:
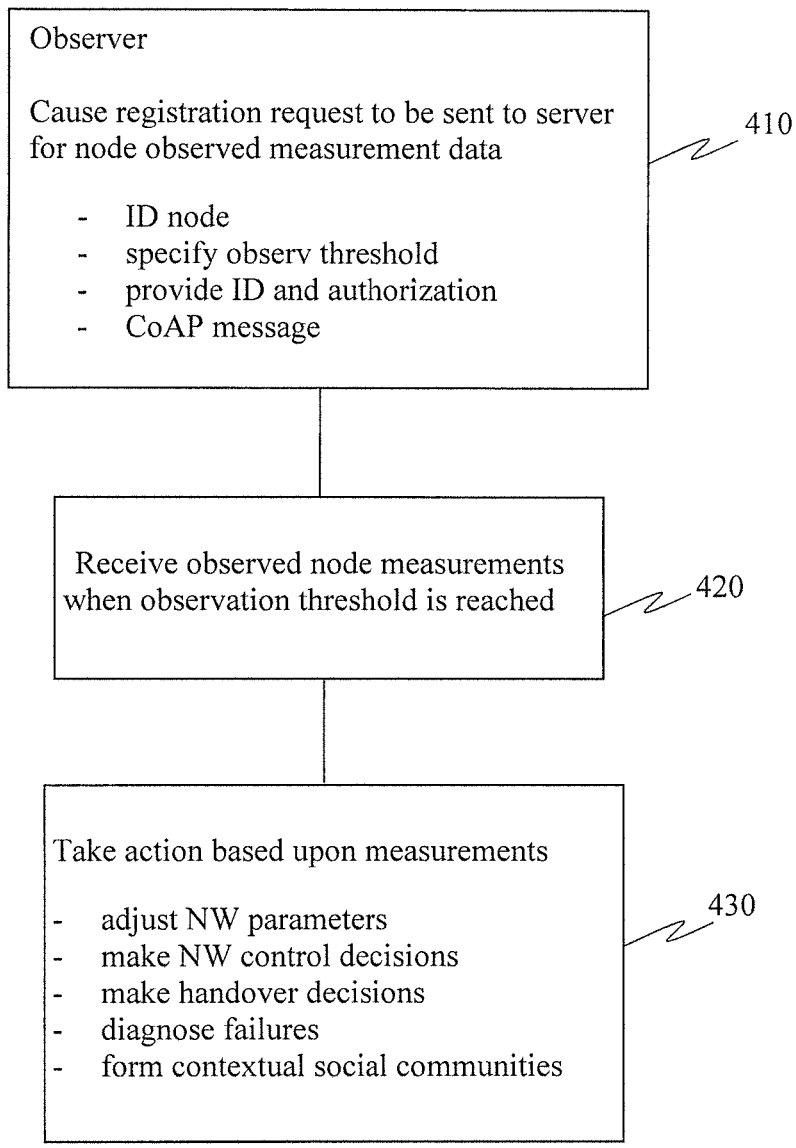

FIG. 5 is a flow diagram of a method in accordance with an example embodiment of the present invention.

DETAILED DESCRIPTION

Example embodiments will now be described more fully hereinafter with reference to the accompanying drawings, in which some, but not necessarily all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

The terms "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term 'circuitry' refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

Various embodiments utilize the ability to remotely observe network nodes in different kinds of network optimization and control decisions. These decisions could be related to:

Cognitive radio optimization: A typical task would be to choose an optimal radio frequency depending on measured parameters such as channel allocation tied to a certain location, maximum available power in a gateway, power and range in a sensor node or data transmission speed of the radio interface.

Mobility: Certain embodiments of the invention may be useful in a mobility scenario, where a node might switch between different gateways and the gateways want to get information immediately if the node's properties, such as quality of radio channel, amount of generated traffic or location change such that a handover could again become viable. For example, if gateway A is acting as one of the intermediate routers for a sensor attached to some other gateway B, gateway A could propose a handover in case the amount of traffic originated by the sensor increases making it more efficient to route the traffic directly to gateway A. Besides resource optimization, the remote observation capability can be used in failure diagnostics: If a node or link fails, this can be detected immediately and a fast handover can be made.

Social networks: A user could observe the measurement data of his/her friends and receive notifications when friends are nearby or when their measurement data indicates that the friends' activity status has reached a certain (perhaps predetermined) value or value range. Using this information, contextual communities can be formed based on who happens to be physically close enough, or in the same activity status (e.g., jogging, partying, studying, laughing, feeling sad, feeling happy, on holiday, or the like).

There are three roles in the system, observer, observed node and a server, illustrated in the embodiments of FIGS. 1 and 2. Referring to FIG. 1, the observer is typically a gateway 104 or a router 114, but could be any entity, and the observed node 102, 110 is typically a sensor, actuator or another gateway device. The server 108 can be any network element that is responsible for storing the measurement data of the observed nodes. In the FIG. 1 orientation, the gateway (observer) 104 and the router (observer) 114 are in the path of data from the network (e.g., the Internet 106) to the observed node 110. Referring to FIG. 2, the observer 118 of one embodiment can be any entity removed from the data path of the observed node. The network gateway 112 for the observed node 102 is not the observer. The server 108 remains remote from, but in communication with, the network 106, e.g., the internet, and the other elements. The FIG. 2 illustration demonstrates that an observer 118 can be anywhere in the network 106 and still be the observer of any node 102 in the network if it has permission to access the measurement data for that node 102.

Referring now to FIG. 3, an apparatus 200 that may be embodied by the observer 104 or other element of the systems of FIGS. 1 and 2 and that may be specifically configured in accordance with an example embodiment of the present invention is illustrated. It should be noted, however, that the devices or elements described below may not be mandatory and thus some may be omitted in certain embodiments. With respect to FIG. 3, the apparatus of the illustrated embodiment may include or otherwise be in communication with a processor 202, a memory device 204 and a communication interface 206. The memory device may comprise, for example, a non-transitory memory, such as one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, applications, instructions or the like for enabling the apparatus to carry out various functions in accordance with example embodiments of the present invention. For example, the memory device could be configured to buffer input data for processing by the processor. Additionally or alternatively, the memory device could be configured to store instructions for execution by the processor.

The apparatus 200 may, in some embodiments, be an observer 104 or another element of the system of FIGS. 1 and 2 as described above. However, in some embodiments, the apparatus may be embodied as a chip or chip set (which may in turn be employed at one of the devices mentioned above). In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry comprised thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein. The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may comprise one or more processing cores configured to perform independently. A multi-core processor may enable multiprocessing within a single physical package. Additionally or alternatively, the processor may comprise one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a computing device) adapted for employing an embodiment of the present invention by further configuration of the processor by instructions for performing the algorithms and/or operations described herein. The processor may comprise, among other things, a clock, an arithmetic logic unit (ALU) and logic gates configured to support operation of the processor.

Meanwhile, the communication interface 206 may be any means such as a device or circuitry embodied in either hardware or a combination of hardware and software that is configured to receive and/or transmit data from/to other elements of the system of FIGS. 1 and 2. In this regard, the communication interface may comprise, for example, an antenna (or multiple antennas) and supporting hardware and/or software for enabling communications with a wireless communication network, e.g., wireless local area network (WLAN). As such, for example, the communication interface may comprise a communication modem and/or other hardware/software for supporting communication via cable, digital subscriber line (DSL), universal serial bus (USB) or other mechanisms.

Referring to FIG. 4, the observed nodes 102 may send measurement data 310 to the servers 108 more or less regularly. The observer 306 of this embodiment first sends a register request 314 to the server 108 indicating which nodes and which parameters are being observed and what the observation threshold is. The observer 306 may need to include identification and authentication parameters in the registration so that the server 108 can grant access to nodes' information. The observed node 102 may also indicate to the server 108 which observers are allowed to view the information. In the case of a Social networks use case, the authorization list could be the node owner's friend list (or part of it)—in this case the observer 102 would indicate its user's social network identity to the server 108.

When the predetermined observation threshold has been exceeded or otherwise satisfied, the server 108 of this embodiment sends a notification message 318 to the observer 306. Depending on the use-case, the observer implements the necessary logic to perform related optimizations and decisions 308.

The benefits of applying remote observation in the aforementioned use-cases are illustrated in the following two scenarios. In scenario 1) if the nodes, such as sensors, are either directly connected to the observing device or the observing device is one of the intermediate routers along the path, the packets do not have to be affected on their way towards their destination. Only when there is a significant change in the measurement value or a certain threshold has been exceeded, will the observing device of this embodiment be notified. This technique clearly improves privacy, since only dedicated servers are allowed to monitor the data of the end users in accordance with one embodiment. In scenario 2) if the observing device is not forwarding the node's packets and thus does not have direct control, it can still observe the node's status from anywhere in the network.

In one implementation option the observer could be located at Proxy Mobile Internet Protocol (IP) Mobile Access Gateway (PMIP MAG) [RFC5213] and/or the gateways of FIG. 1 could represent MAGs. The observer could also locate at some other network based mobility solution entity (this technology field is actively developed in the Internet Engineering Task Force (IETF)) that monitors the state of nodes. Based on received information the observer could agree with the node and/or MAGs about mobility (handover) decisions.

Referring again to FIG. 4, the signaling is in the form of Constrained Application Protocol (CoAP) messages. CoAP is an application layer protocol designed to be integrated with the worldwide web. It is designed to easily translate to the hypertext transfer protocol (HTTP). CoAP is a specialized "representational state transfer" (RESTful) protocol for use with constrained networks and nodes in machine-to-machine (M2M) applications. Details about the CoAP message formats can be obtained from the IETF web site (ietf.org) under "Constrained Application Protocol (CoAP) draft-ietf-core-coap-11."

While this description focuses on using "CoAP GET" messages with "Observe Option" for registration, and "CoAP Response" messages with "Observe Option" for notifications, some other messages could be also used. For example, in case of Awarenet, the observer could SUBscribe to receive PUBlishments if certain thresholds are exceeded. Proprietary protocols are also possible.

Referring to FIG. 5 there is illustrated an embodiment of a method in which an observer includes means, such as the processor 202, the communication interface 206 or the like, causes a registration request 410 to be sent to the network server for access to observed node measurement data. In that request, the observer may communicate the identification of the node for which measurement information is requested and may specify the observation threshold that should be applied to the node measurement reports. The threshold prevents the observer from having to deal with every measurement that the node sends to the server. The observer may further provide its own identification and authorization to receive the node measurement data that it is requesting. The request may be sent in a CoAP message format.

The method of this embodiment continues with the observer including means, such as the processor 202, the communication interface 206 or the like, for receiving node measurement information 420 when the observation threshold is satisfied, such as by being reached. The observer may also include means, such as the processor or the like, for taking action 430 based upon the measurement data. The action may include adjusting, e.g., optimizing, network parameters such as channel allocation for a certain location by choosing a radio frequency, such as an optimal radio frequency, based on one or more measured parameters including, for example, channel allocation at a certain location, maximum available power in a gateway, power and range in a sensor node or data transmission speed of a radio interface. The "certain location" is a geolocation which may be determined by GPS, cell network identification, triangulation from known WLAN access points, or the like. The geolocation information of an observed node can be part of the "predetermined threshold" (that is, the trigger for notifications) and/or be part of the notification messages. For example, if the signal strength threshold is passed and that triggers notification sending, the notification could include the geolocation of the observed node.

In a mobility scenario the node might switch between different gateways wherein the gateway would need node measurement information quickly if the node's properties were such that a handover would again be viable. That is, if gateway A was an intermediate router for a sensor in gateway B, gateway A could propose a handover if the traffic originated by the sensor increased, making it more efficient to route the traffic directly to A. Other actions could be taken for failures, wherein a diagnosed node failure could lead to an immediate, e.g., a fast, handover. Finally, a user could observe measurement data of her friends and receive notification when they are in close proximity or engaged in like activities. A contextual virtual community could be formed based on this information by linking the friends.

Several advantages may be obtained by implementing the various embodiments described herein. The method may preserve privacy since intermediate nodes will not interfere with end users' packets. Action taken on measurements of observed node performance may significantly improve network performance and decrease processing requirements of the intermediate nodes since the data does not have to be processed before the destination. An example embodiment of the invention enables observation based on rules that can be tailored to provide required input for different optimization goals, such as cognitive radio optimization, handovers, network performance optimization, or social community formation. And an embodiment of the invention can be utilized in failure diagnostics and security systems.

As described above, FIG. 5 is a flowchart of a method, apparatus and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus.

As will be appreciated, any such computer program instructions may be loaded onto a computer or other programmable apparatus (e.g., hardware) to produce a machine, such that the resulting computer or other programmable apparatus embody a mechanism for implementing the functions specified in the flowchart blocks. These computer program instructions may also be stored in a non-transitory computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the function specified in the flowchart blocks.

The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 4, when executed, convert a computer or processing circuitry into a particular machine configured to perform an example embodiment of the present invention.

Accordingly, the operations of FIG. 5 define an algorithm for configuring a computer or processing circuitry (e.g., processor) to perform an example embodiment. In some cases, a general purpose computer may be configured to perform the functions shown in FIG. 4 (e.g., via configuration of the processor), thereby transforming the general purpose computer into a particular machine configured to perform an example embodiment.

Accordingly, blocks of the flowchart support combinations of means for performing the specified functions, combinations of operations for performing the specified functions and program instructions for performing the specified functions. It will also be understood that one or more blocks of the flowcharts, and combinations of blocks in the flowcharts, can be implemented by special purpose hardware-based computer systems which perform the specified functions or operations, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   causing a registration request to be sent for access to observed node measurement information;
   receiving the observed node measurement information in an instance in which a predetermined threshold is satisfied, wherein the observed node measurement information comprises a geolocation of an observed node; and
   taking action based on said observed node measurement information, wherein taking action further comprises adjusting network parameters for a certain location by choosing a radio frequency based on one or more measured parameters, wherein said taking action based on said observed node measurement information comprises one or more of altering network parameters, making appropriate network control decisions, or forming contextual social network communities, and wherein forming contextual social network communities comprises observing measurement data of friends, including one or more of receiving a notification when a friend is in close physical proximity or determining from measurement data that a friend has a same activity status, and then linking the friend into a social network community.

2. The method of claim 1 further comprising:
   identifying in said registration request a network node for which measurement information is requested.

3. The method of claim 1 further comprising:
   identifying in said registration request the predetermined threshold for reporting observed node measurement information.

4. The method of claim 1 further comprising:
   identifying in said registration request the requestor's identity and authorization to receive the observed node measurement information.

5. The method of claim 1 wherein,
   altering network parameters comprises one or more of choosing a radio frequency based on one or more measured parameters including one or more of channel allocation at a certain location, maximum available power in a gateway, power and range in a sensor node, or data transmission speed of a radio interface.

6. The method of claim 1 wherein,
   making network control decisions comprises one or more of switching said node between gateways when the node's properties change such that a handover becomes viable, and failure scenarios wherein upon a node failure determination a fast handover to another node is made.

7. An apparatus comprising: at least a processor and a memory communicatively associated with the processor with computer coded instructions stored therein, said instructions when executed by the processor causing the apparatus to perform:
   causing a registration request to be sent for access to observed node measurement information;
   receiving the observed node measurement information in an instance in which a predetermined threshold is satisfied, wherein the observed node measurement information comprises a geolocation of an observed node; and
   taking action based on said observed node measurement information, wherein taking action further comprises adjusting network parameters for a certain location by choosing a radio frequency based on one or more measured parameters, wherein said taking action based on said observed node measurement information comprises one or more of altering network parameters, making appropriate network control decisions, or forming contextual social network communities, and wherein forming contextual social network communities comprises observing measurement data of friends, including one or more of receiving a notification when a friend is in close physical proximity or determining from measurement data that a friend has a same activity status, and then linking the friend into a social network community.

8. The apparatus of claim 7, further comprising instructions that cause the apparatus to perform the process of:
   identifying in said registration request a network node for which measurement information is requested.

9. The apparatus of claim 7, further comprising instructions that cause the apparatus to perform the process of:
   identifying in said registration request the predetermined threshold for reporting observed node measurement information.

10. The apparatus of claim 7, further comprising instructions that cause the apparatus to perform the process of:
    identifying in said registration request the requestor's identity and authorization to receive the observed node measurement information.

11. The apparatus of claim 7, further comprising instructions that cause the apparatus to perform the process of:
    causing the registration request to be signaled in a Constrained Application Protocol (CoAP) message.

12. The apparatus of claim 11, further comprising instructions that cause the apparatus to perform the process of:
    formatting the registration request as a CoAP GET message with Observe Option.

13. The apparatus of claim 7, further comprising instructions wherein
    adjusting network parameters comprises one or more of choosing a radio frequency based on one or more measured parameters including one or more of channel allocation at a certain location, maximum available power in a gateway, power and range in a sensor node, or data transmission speed of a radio interface.

14. The apparatus of claim 7, further comprising instructions wherein
    making network control decisions comprises one or more of switching said node between gateways when the node's properties change such that a handover becomes viable, and failure scenarios wherein upon a node failure determination a fast handover to another node is made.

15. A computer program product comprising a non-transitory computer readable medium having computer coded instructions stored therein, said instructions when executed by a processor, causing an apparatus to perform the process of:

causing a registration request to be sent for access to observed node measurement information;

receiving the observed node measurement information in an instance in which a predetermined threshold is satisfied, wherein the observed node measurement information comprises a geolocation of an observed node; and taking action based on said observed node measurement information, wherein taking action further comprises adjusting network parameters for a certain location by choosing a radio frequency based on one or more measured parameters, wherein said taking action based on said observed node measurement information comprises one or more of altering network parameters, making appropriate network control decisions, or forming contextual social network communities, and wherein forming contextual social network communities comprises observing measurement data of friends, including one or more of receiving a notification when a friend is in close physical proximity or determining from measurement data that a friend has a same activity status, and then linking the friend into a social network community.

16. The computer program product of claim 15, further comprising instructions that cause the apparatus to perform the process of:

identifying in said registration request a network node for which measurement information is requested.

\* \* \* \* \*

UNITED STATES PATENT AND TRADEMARK OFFICE
CERTIFICATE OF CORRECTION

PATENT NO.      : 9,781,622 B2
APPLICATION NO. : 14/423851
DATED           : October 3, 2017
INVENTOR(S)     : Nieminen et al.

Page 1 of 1

It is certified that error appears in the above-identified patent and that said Letters Patent is hereby corrected as shown below:

In the Drawings

Sheet 4 of 5, Fig. 4, Tag "318", Line 1, "nofication" should read --notification--.
Sheet 5 of 5, Fig. 5, Box "410", Line 5, "observ" should read --observation--.

Signed and Sealed this
Twelfth Day of June, 2018

Andrei Iancu
*Director of the United States Patent and Trademark Office*